United States Patent
Xu et al.

(10) Patent No.: US 9,585,107 B2
(45) Date of Patent: Feb. 28, 2017

(54) PHR PROCESSING METHOD AND DEVICE IN CARRIER AGGREGATION SYSTEM

(71) Applicant: CHINA ACADEMY OF TELECOMMUNICATIONS TECHNOLOGY, Beijing OT (CN)

(72) Inventors: Fangli Xu, Beijing (CN); Yali Zhao, Beijing (CN)

(73) Assignee: China Academy Of Telecommunications Technology, Beijing (CN)

(*) Notice: Subject to any disclaimer, the term of this patent is extended or adjusted under 35 U.S.C. 154(b) by 0 days.

(21) Appl. No.: 13/691,752

(22) Filed: Dec. 1, 2012

(65) Prior Publication Data

US 2013/0182658 A1 Jul. 18, 2013

Related U.S. Application Data

(63) Continuation of application No. PCT/CN2011/080170, filed on Sep. 26, 2011.

(30) Foreign Application Priority Data

Sep. 29, 2010 (CN) .......................... 2010 1 0299887

(51) Int. Cl.
*H04W 52/06* (2009.01)
*H04W 52/36* (2009.01)
(Continued)

(52) U.S. Cl.
CPC ........... *H04W 52/365* (2013.01); *H04L 5/001* (2013.01); *H04W 52/242* (2013.01); *H04L 5/006* (2013.01);
(Continued)

(58) Field of Classification Search
CPC ....... H04L 5/001; H04L 5/006; H04L 5/0085; H04W 8/24; H04W 52/242; H04W 52/365; H04W 72/00; H04W 28/04
(Continued)

(56) References Cited

U.S. PATENT DOCUMENTS

2009/0245191 A1* 10/2009 Ball et al. ................... 370/329
2009/0318180 A1* 12/2009 Yi et al. ...................... 455/522
(Continued)

FOREIGN PATENT DOCUMENTS

| CN | 101778416 A | 7/2010 |
| CN | 101841844 A | 9/2010 |

(Continued)

OTHER PUBLICATIONS

Motorola, "Batch 1B—Introduction of new test case 7.1.4.16: UE Power HeadRoom Reporting [DL_Pathloss change reporting]", Nov. 10, 2008, 3GPP TSG RAN WG5 #41, R5-085199, pp. 1-6.*
Motorola et al., "GCF Priority 2—Corrections to MAC test case 7.1.4.16", Jun. 23, 2009, 3GPP TSG-RAN WG5 Meeting #43bis, R5-093300, pp. 1-6.*
ZTE et al., "GCF priority 2—Update of MAC test case 7.1.4.16", Aug. 24, 2009, 3GPP TSG-RAN5 Meeting #44, R5-094093, pp. 1-7.*
(Continued)

*Primary Examiner* — Paul H Masur
(74) *Attorney, Agent, or Firm* — Ladas & Parry, LLP

(57) ABSTRACT

A power headroom reporting (PHR) processing method in carrier aggregation system and a device thereof are provided. The PHR processing method includes the following steps: user equipment (UE) acquires a pathloss change corresponding to an uplink carrier which is in an activation state at present; the UE determines whether a PHR is to be triggered based on the pathloss change; if the PHR is to be triggered, the UE acquires power headroom (PH) information to be reported and reports the PH information.

6 Claims, 2 Drawing Sheets

(51) Int. Cl.
*H04L 5/00* (2006.01)
*H04W 52/24* (2009.01)
*H04W 8/24* (2009.01)
*H04W 72/00* (2009.01)
*H04W 52/34* (2009.01)

(52) U.S. Cl.
CPC ............. *H04L 5/0085* (2013.01); *H04W 8/24* (2013.01); *H04W 52/34* (2013.01); *H04W 72/00* (2013.01)

(58) Field of Classification Search
USPC .................................. 370/329; 455/450–454
See application file for complete search history.

(56) References Cited

U.S. PATENT DOCUMENTS

| | | | | |
|---|---|---|---|---|
| 2010/0158147 | A1* | 6/2010 | Zhang et al. ................. | 375/260 |
| 2010/0238863 | A1* | 9/2010 | Guo et al. ..................... | 370/328 |
| 2010/0273515 | A1* | 10/2010 | Fabien et al. ................ | 455/509 |
| 2010/0296470 | A1* | 11/2010 | Heo et al. ..................... | 370/329 |
| 2010/0296471 | A1* | 11/2010 | Heo et al. ..................... | 370/329 |
| 2010/0297993 | A1* | 11/2010 | Heo et al. ..................... | 455/423 |
| 2011/0105173 | A1* | 5/2011 | Haim et al. ................... | 455/522 |
| 2011/0243016 | A1* | 10/2011 | Zhang et al. ................. | 370/252 |
| 2011/0310760 | A1* | 12/2011 | Wu et al. ..................... | 370/252 |
| 2012/0008552 | A1* | 1/2012 | Baldemair et al. ........... | 370/328 |
| 2012/0218904 | A1* | 8/2012 | Narasimha et al. .......... | 370/248 |

FOREIGN PATENT DOCUMENTS

| | | |
|---|---|---|
| CN | 102118786 A | 7/2011 |
| WO | 2009/154403 A2 | 12/2009 |
| WO | 2010/065759 A2 | 6/2010 |

OTHER PUBLICATIONS

Huawei, "GCF Priority 2—Update of TC 7.1.4.16", Aug. 23, 2010, 3GPP TSG-WG R5 Meeting #48, R5-104535, pp. 1-6.*
Office Action for corresponding Korean App No. 10-2012-7024440 mailed on Oct. 18, 2013 and its English translation.
Office Action for corresponding Chinese App No. 201010299887.0 mailed on Feb. 16, 2013 and its English translation.
Office Action for corresponding Chinese App No. 201010299887.0 mailed on Oct. 23, 2013 and its English translation.
Office Action for corresponding Chinese App No. 201010299887.0 mailed on Apr. 21, 2014 and its English translation.
Office Action for corresponding Chinese App No. 201010299887.0 mailed on Nov. 5, 2014 and its English translation.
Technical Specification Group Radio Access Network: 3GPP TS 36.321 V8.8.0: Evolved Universal Terrestrial Radio Access (E-UTRA); Medium Access Control (MAC) Protocol specification (Release 8) $3^{rd}$ Generation Partnership Project (3GPP). Dec. 31, 2009.
ISR for PCT/CN2011/080170 mailed on Jan. 5, 2012 and its English translation by WIPO.
Written Opinion for PCT/CN2011/080170 mailed on Jan. 5, 2012 and its English translation by WIPO.
European Search Report for PCT/CN2011080170 mailed on May 2, 2014.
Motorola: "Power Headroom Reporting for CA", 3GPP Draft; R2-102762, $3^{rd}$ Generation Partnership Project (3GPP), RAN WG2 Meeting #70, May 4, 2010.
Nokia Siemens Networks et al: "PHR triggers for CA", 3GPP Draft; R2-104393 PHR Triggers for CA, $3^{rd}$ Generation Partnership Project (3GPP), RAN WG2 Meeting #71, Aug. 17, 2010.
Samsung: "Discussion on PHR triggers"; R2-104829, 3rd Generation Partnership Project (3GPP), RAN2 Meeting #71, Aug. 27, 2010.

* cited by examiner

```
phr-Config                    CHOICE {
    release                   NULL,
    setup                     SEQUENCE {
        periodicPHR-Timer         ENUMERATED {sf10, sf20, sf50, sf100, sf200,
                                              sf500, sf1000, infinity},
    ////Explanation: sf10 means that the period of periodicPHR-Timer is 10 subframes and the like
        prohibitPHR-Timer         ENUMERATED {sf0, sf10, sf20, sf50, sf100,
                                              sf200, sf500, sf1000},
    //Explanation: sf10 means that the period of prohibitPHR-Timer is 10 subframes and the like
        dl-PathlossChange         ENUMERATED {dB1, dB3, dB6, infinity}
    //Explanation: dB1 means that the value of d1-PathlossChange is 1dB and the like
}
```

Figure 1

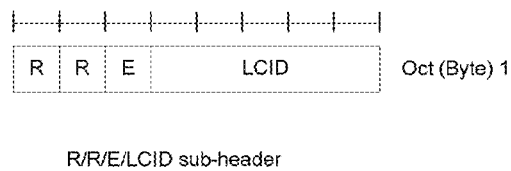

R/R/E/LCID sub-header

Figure 2

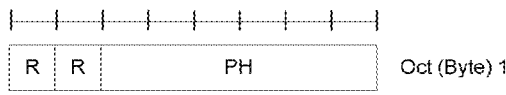

Figure 3

PHR PROCESSING METHOD AND DEVICE IN CARRIER AGGREGATION SYSTEM

CROSS REFERENCE TO RELATED APPLICATIONS

This application is a continuation of PCT/CN2011/080170 filed on Sep. 26, 2011, which claims priority to Chinese Patent Application No. 201010299887.0 filed in the Patent Office of the People's Republic of China on Sep. 29, 2010, entitled "PHR Processing Method and Device in Carrier Aggregation System" the disclosures of which are hereby incorporated by reference in their entireties.

FIELD OF THE INVENTION

The present invention relates to the field of communication technology, in particular to the PHR processing method and device in carrier aggregation system.

BACKGROUND OF THE INVENTION (1) CA (Carrier Aggregation)

Peak rate of LTE-A (LTE-Advanced) system has improved greatly compared with that of LTE (Long Term Evolution) system. The downlink rate must reach 1 Gbps and uplink rate must be 500 Mbps. Meanwhile, LTE-A system is required to be well compatible with LTE system.

For sake of peak rate increase and compatibility with LTE system and full use of spectrum resource, LTE-A system introduces CA (Carrier Aggregation) technology, which means that uplink and downlink include more than one CC (component carrier) in a cell.

Specifically, each CC in CA system can be continuous or discontinuous. Meanwhile, the bandwidth between different CCs can be the same or different, however, for keeping compatible with LTE system, the maximum bandwidth of each CC is limited to 20 MHz, and generally the maximum amount of CC is 5.

(2) LTE PHR (Power Headroom Reporting)

The meaning of PHR in LTE system: the difference between the maximum transmitted power and the estimated transmitted power of UE (user equipment). PH can be calculated according to the following formula: PH (Power Headroom)=PMAX (the maximum transmitted power of UE)−PPUSCH (the power consumed by PUSCH (physical uplink shared channel) carrying PHR information).

In course of implementing the present invention, the inventor finds out there are at least the problems below in the present technology:

In LTE system, UE works only on one DL (downlink)/UL (uplink) CC. When pathloss of CC changes and reaches the threshold, PHR will be triggered. However, the corresponding processing method on how pathloss change of each CC affects the reporting process of UE PHR when UE is configured with more than one UL and DL CC in LTE-A CA is not shown in the present technology.

SUMMARY OF THE INVENTION

The embodiments of the present invention provide the PHR processing method and device in carrier aggregation system to trigger PHR and report the corresponding PH information to network side.

To achieve the above objective, the embodiments of the present invention provide a PHR processing method in carrier aggregation system, including:

User equipment acquires pathloss change corresponding to uplink carrier in activation state at present;

Said user equipment judges whether to trigger PHR or not according to said pathloss change;

If "Yes", said user equipment will acquire power headroom (PH) information to be reported and report said PH information.

The embodiments of the present invention provide a user equipment, including:

Acquisition module, which is used to acquire pathloss change corresponding to uplink carrier in activation state at present;

Judgment module, which is used to judge whether to trigger PHR or not according to said pathloss change acquired through said acquisition module;

Processing module, which is used to acquire PH information to be reported and report said PH information when judgment result is "Yes".

Compared with the present technology, the present invention at least possesses the following advantages:

In carrier aggregation system, UE can trigger PHR according to pathloss change on an activated UL carrier, thus solving the problem that how UE triggers PHR when more than one pathloss are acquired in carrier aggregation system.

BRIEF DESCRIPTION OF THE DRAWINGS

FIG. 1 is a diagram of PHR-related configuration in RRC layer in the present technology;

FIG. 2 is a diagram of MAC sub-header in the present technology;

FIG. 3 is a diagram of PHR MAC CE in the present technology;

DETAILED DESCRIPTION OF THE EMBODIMENTS OF THE INVENTION

Figure 4:
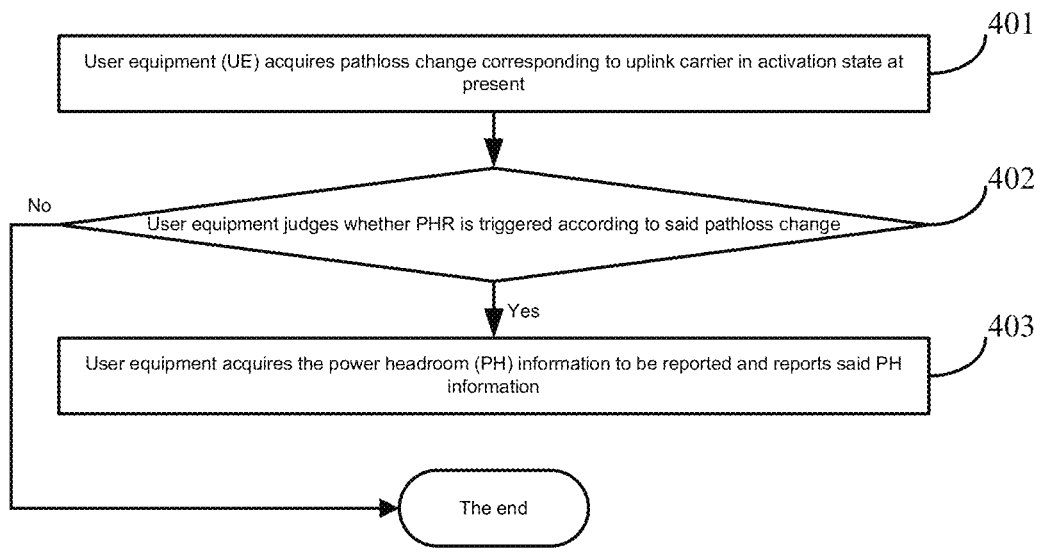
FIG. 4 is a flow diagram for PHR processing method in carrier aggregation system provided by Embodiment I of the present invention.

Detailed description of the embodiments of the present invention is described in detail below in combination with the drawings and embodiments:

In LTE system, PHR-related technology includes:

(1) Parameter configuration of RRC (Radio Resource Control) layer relating to PHR. PHR aims to inform eNB of the difference between the maximum transmitted power of UE and the estimated transmitted power of UL-SCH (UL-Shared Channel) estimated by UE. The parameter reported by PHR is configured by RRC layer, including: timing parameter, the period of periodicPHR-Timer, the length of prohibitPHR-Timer, the dl-PathlossChange parameters of triggered PHR, and the diagram of PHR-related configuration in RRC layer is shown in FIG. 1.

(2) The triggering system of PHR. PHR can be triggered if one of the following conditions is met:

Uplink resource in said UE is available, prohibitPHR-Timer times out and the pathloss change at the most recent PHR exceeds dl-PathlossChange dB;

PeriodicPHR-Timer times out;

High layer configure PHR initially, or re-configure PHR.

(3) PHR format. An MAC (Media Access Control) sub-header and an MAC CE (Control Element) shown in the diagram of MAC sub-header in FIG. 2 and the diagram of PHR MAC CE in FIG. 3 are included during PHR in LTE system.

Therein, each domain involves the following:

LCID (Logical Channel ID): for identifying the logical channel of corresponding loading part. For PHR, LCID is used for identifying corresponding loading part, namely PHR.

E: extension bit, which is used for identifying whether next byte is MAC sub-header or MAC load.

R: reserved bit.

PH: power headroom.

(4) Reporting process of PHR. If uplink resource in said UE is available, reporting is conducted according to the priority of logical channel once PHR is triggered. If a PHR MAC CE can be contained in the uplink resource distributed for UE, then: inform the physical layer to calculate PH value; inform to generate PHR MAC CE during Multiplexing and Assembly process; start/restart periodicPHR-Timer; start/restart prohibitPHR-Timer; and cancel all triggered PHR.

In addition, CA technology is introduced in LTE-A system to support higher peak rate. At present, conditions relating to PHR in LTE-A CA include:

Each CC has PH information of its own on more than one UL CC where UE works, that is CC is taken as the unit of PH information;

PH information of more than one CC is packed in an MAC CE to send to network when PH information is reported by more than one CC within a TTI (Transmission Time Interval);

The corresponding pathloss reference CC on UL CC configured by UE can be from PCell or DL CC linked with SIB2 (System Information Block);

Pathloss can be measured by UE on more than one DL CC or on DL CC in deactivation state;

Activation and deactivation state may be introduced to the Uplink.

To solve the problem that how the reporting process of UE PHR is realized without LTE-A carrier aggregation in the present technology, the embodiments of the present invention put forward the PHR processing method and device in carrier aggregation system. When pathloss change corresponding to uplink carrier in activation state on UE exceeds the threshold, PHR is triggered by UE, thus solving the problem that how PHR is triggered by UE when more than one pathloss is acquired in carrier aggregation system.

The technical solution of the embodiments of the present invention will be described clearly and completely in combination with the drawings. Apparently, the described embodiments are only a part of the embodiments of the present invention. Other embodiments based on the embodiments of the present invention acquired by technical personnel of the field without contributing creative work shall be protected by the present invention.

Embodiment I of the present invention provides the PHR processing method in carrier aggregation system as shown in FIG. 4, including the following steps:

Step 401: User equipment acquires Pathloss changes corresponding to uplink carrier in activation state. Such change refers to the one of uplink carrier at the most recent PHR.

In the embodiments of the present invention, PHR is only triggered when pathloss change corresponding to uplink carrier in activation state exceeds the threshold at UE side.

Therefore, it is necessary for UE to acquire pathloss change of uplink carrier in activation state at present at the most recent PHR.

Furthermore, user equipment also needs to acquire pathloss change of uplink carrier with UL Grant at the most recent PHR.

Furthermore, uplink retransmission shall be excluded from UL Grant. At this time, the uplink carrier refers to the one with new UL Grant, that is user equipment needs to acquire pathloss change of uplink carrier with new UL Grant at the most recent PHR.

Step 402: User equipment judges whether PHR is triggered according to pathloss. If it is triggered, step 403 is carried on. Otherwise, procedure will be terminated.

In the embodiments of the present invention, this step can be processed according to the following 3 methods according to prohibitPHR-Timer and periodicPHR-Timer maintenance:

(1) prohibitPHR-Timer and periodicPHR-Timer are maintained per on user equipment (UE).

In this step, UE can judge whether preset trigger condition is met according to pathloss when new UL Grant is on any UL CC (uplink component carrier) at UE side;

prohibitPHR-Timer times out, and pathloss change of at least one uplink CC in activation state at the most recent PHR (namely the difference between newly obtained downlink pathloss and pathloss at the most recent UE PHR transmission) exceeds preset threshold;

periodicPHR-Timer times out;

Configure or reconfigure PHR function;

Certainly, in actual application, the default trigger conditions are not limited to these, and other trigger conditions are not given in embodiment of this invention.

If one or several of the default trigger conditions are met, PHR will be triggered absolutely; otherwise, PHR will not be triggered.

(2) prohibitPHR-Timer is maintained per component carrier (CC) and periodicPHR-Timer is maintained per user equipment.

In this step, when new UL Grant is on a certain UL CC at UE side, UE can judge whether each uplink carrier in activation state meets preset trigger condition according to pathloss change, that is judgment condition of PHR trigger on each CC in activation state is as follows:

When prohibitPHR-Timer on UL CC in activation state times out, corresponding to the latest UE PHR transmission, pathloss change on CC at the most recent PHR (namely pathloss change corresponding to UL CC) exceeds preset threshold;

periodicPHR-Timer of UE times out;

Configure or reconfigure PHR function;

Certainly, in actual application, the default trigger conditions are not limited to these, and other trigger conditions are not given in embodiment of this invention.

If one or several of the default trigger conditions are met, PHR will be triggered absolutely; otherwise, PHR will not be triggered.

(3) prohibitPHR-Timer is maintained per component carrier (CC) and periodicPHR-Timer is maintained per CC.

In this step, when new UL Grant is on a certain UL CC on UE, UE can judge whether each component carrier with UL Grant meets preset trigger condition according to pathloss change, that is judgment condition of PHR trigger on each CC in activation state is as follows:

periodicPHR-Timer on CC times out, and pathloss change on CC at the most recent PHR exceeds preset threshold;

periodicPHR-Timer on CC times out;

Configure or reconfigure PHR function;

Certainly, in actual application, the default trigger conditions are not limited to these, and other trigger conditions are not given in embodiment of this invention.

If one or several of the default trigger conditions are met, PHR will be triggered absolutely; otherwise, PHR will not be triggered.

Step 403, user equipment acquires the required power headroom (PH) information to be reported and reports it.

In the embodiments of the present invention, this step can also be processed according to the following 3 methods corresponding to step 402 according to prohibitPHR-Timer and periodicPHR-Timer maintenance:

(1) prohibitPHR-Timer and periodicPHR-Timer are maintained per user equipment.

In this step, it is necessary for user equipment to acquire PH information of all the activated uplink carriers and make such information carried in PHR MAC CE to be reported to network side.

Specifically, when UE PHR is triggered, it is necessary to report PH information of UE's all UL CCs in activation state and organize PHR MAC CE to make such information carried in PHR MAC CE to be reported to network side. PHR MAC CE can be reported through this component carrier or other component carriers during PHR MAC CE reporting; indication information of component carrier shall be carried in PHR MAC CE when PHR MAC CE is reported through other component carriers.

In addition, it is necessary to start or restart periodicPHR-Timer and prohibitPHR-Timer after PH information is reported.

(2) prohibitPHR-Timer is maintained per component carrier (CC) and periodicPHR-Timer is maintained per user equipment.

In this step, if PHR is triggered by prohibitPHR-Timer timeout (that is prohibitPHR-Timer on UL CC in activation state times out and pathloss change on CC at the most recent PHR exceeds preset threshold), it is necessary for user equipment to acquire PH information of this uplink carrier (namely the uplink carrier on triggered PHR), and make such information carried in PHR MAC CE to be reported to network side. Only PH information of CC of the triggered PHR is included during PHR MAC CE organization. In addition, prohibitPHR-Timer corresponding to CC shall be restarted after reporting PH information.

If PHR is triggered by prohibitPHR-Timer timeout and/or configuration or re-configuration of PHR function, user equipment shall acquire PH information of all uplink carriers in activation state, and make such information carried in PHR MAC CE to be reported to network side. PH information of all UL CCs in activation state shall be included during PHR MAC CE organization. PHR MAC CE can be reported through this component carrier or other component carriers during PHR MAC CE reporting; indication information of component carrier shall be carried in PHR MAC CE when PHR MAC CE is reported through other component carriers.

Besides, prohibitPHR-Timer and periodicPHR-Timer on all CCs in activation state shall be restarted after PH information is reported.

(3) prohibitPHR-Timer and periodicPHR-Timer are maintained per component carrier (CC).

In this step, user equipment shall acquire PH information of uplink carrier of the triggered PHR, and make such information carried in PHR MAC CE to be reported to network side. PH information of UL CC of the triggered PHR can only be included during PHR MAC CE organization. PHR MAC CE can be reported through this component carrier or other component carriers during PHR MAC CE reporting; indication information of component carrier shall be carried in PHR MAC CE when PHR MAC CE is reported through other component carriers.

Besides, prohibitPHR-Timer and periodicPHR-Timer corresponding to UL CC shall be started or restarted after PH information is reported.

Embodiment II of the present invention provides a PHR processing method in carrier aggregation system, where prohibitPHR-Timer and periodicPHR-Timer are maintained per UE.

Suppose UE has 2 UL CCs, namely UL CC1 and UL CC2 and their reference carrier of configuration pathloss is DL CC1 and CC2 linked with SIB2. When a certain TTI has UL Grant of uplink new data transmission (namely new UL Grant):

Condition 1: If periodicPHR-Timer doesn't time out, prohibitPHR-Timer times out, CC2 is deactivated and pathloss change of DL CC2 exceeds preset threshold, and pathloss change corresponding to CC1 does not exceed preset threshold, UE PHR MAC CE transmission will not be triggered.

Condition 2: If periodicPHR-Timer doesn't time out, prohibitPHR-Timer times out, CC1 is activated and pathloss change does not exceed preset threshold, CC2 is activated and the pathloss change exceeds preset threshold, UE PHR will be triggered with PH information of CC1 and CC2 carried in PHR MAC CE.

Condition 3: If periodicPHR-Timer doesn't time out, prohibitPHR-Timer times out, CC1 is activated and pathloss change exceeds preset threshold and CC2 is deactivated, UE PHR will be triggered with PH information of CC1 carried in PHR MAC CE.

Condition 4: If periodicPHR-Timer times out and CC1 and CC2 are activated, UE PHR will be triggered with PH information of CC1 and CC2 carried in PHR MAC CE.

Condition 5: If periodicPHR-Timer times out, CC1 is activated, UE PHR will be triggered with PH information of CC1 carried in PHR MAC CE.

Embodiment III of the present invention provides a PHR processing method in carrier aggregation system, where prohibitPHR-Timer and periodicPHR-Timer are maintained per UE.

Suppose UE has two uplink CCs, namely, UL CC1 and UL CC2, and their reference carrier of configuration pathloss is DL CC1. When certain TTI has UL Grant of uplink new data transmission, Condition 1: If periodicPHR-Timer doesn't time out, prohibitPHR-Timer times out, pathloss change of DL CC1 exceeds preset threshold, UL CC1 is activated, UL CC2 will be deactivated, and UE PHR will be triggered with PH information of UL CC1 carried in PHR MAC CE.

Condition 2: If periodicPHR-Timer times out, UL CC1 and CC2 are activated, UE PHR will be triggered with PH information of CC1 and CC2 carried in PHR MAC CE.

Embodiment IV of the present invention provides the PHR processing method in carrier aggregation system, where prohibitPHR-Timer is maintained per CC and periodicPHR-Timer is maintained per UE.

Suppose UE has two uplink CCs, namely, UL CC1 and UL CC2, and their reference carrier of configuration pathloss is DL CC1 and CC2 linked with SIB2. When certain TTI has UL Grant of uplink new data transmission, Condition 1: If periodicPHR-Timer doesn't time out, CC1 is activated, CC2 is not activated, pathloss change of CC1 does not exceed preset threshold and that of CC2 exceeds preset threshold, UE PHR MAC CE transmission will not be triggered, that is PHR will not be triggered and Timer at UE side keeps unchanged.

Condition 2: If periodicPHR-Timer doesn't time out, CC1 is activated, CC2 is not activated, pathloss changes of CC1 and CC2 exceed preset threshold, PHR will be triggered with PH information of CC1 carried in PHR MAC CE. Then prohibitPHR-Timer and periodicPHR-Timer on CC1 are restarted successively.

Condition 3: If periodicPHR-Timer doesn't time out, CC1 and CC2 are activated, and pathloss changes of CC1 and CC2 exceed preset threshold, PHR will be triggered with PH information of CC1 and CC2 carried in PHR MAC CE. Then prohibitPHR-Timer on CC1 and CC2 and periodicPHR-Timer are restarted successively.

Condition 4: If periodicPHR-Timer times out, CC1 and CC2 are activated, UE PHR will be triggered with PH information of CC1 and CC2 carried in PHR MAC CE. Then prohibitPHR-Timer on CC1 and CC2 and periodicPHR-Timer are restarted successively.

Embodiment V of the present invention provides the PHR processing method in carrier aggregation system, where prohibitPHR-Timer is maintained per CC and periodicPHR-Timer is maintained per UE.

Suppose UE has two uplink CCs, namely, UL CC1 and UL CC2, and their reference carrier of configuration pathloss is DL CC1. When certain TTI has UL Grant of uplink new data transmission.

Condition 1: If periodicPHR-Timer doesn't time out, CC1 is activated, CC2 is not activated, and pathloss change of CC1 exceeds preset threshold, PHR will be triggered with PH information of CC1 carried in PHR MAC CE. Then prohibitPHR-Timer on CC1 and periodicPHR-Timer are restarted successively.

Condition 2: If periodicPHR-Timer doesn't time out, CC1 and CC2 are activated, and pathloss change of CC1 exceeds preset threshold, PHR will be triggered with PH information of CC1 and CC2 carried in PHR MAC CE. Then prohibitPHR-Timer on CC1 and periodicPHR-Timer are restarted successively.

Condition 3: If periodicPHR-Timer times out, and CC1/CC2 is activated, PHR will be triggered with PH information of CC1 and CC2 carried in PHR MAC CE. Then prohibitPHR-Timer on CC1 and periodicPHR-Timer are restarted successively.

Embodiment VI of the present invention provides the PHR processing method in carrier aggregation system, where prohibitPHR-Timer and periodicPHR-Timer are maintained per CC.

Suppose UE has two uplink CCs, namely, UL CC1 and UL CC2, and their reference carrier of configuration pathloss is DL CC1 and CC2 linked with SIB2. When certain TTI has UL Grant of uplink new data transmission, Condition 1: If CC1 has UL Grant, while CC2 does not have, and pathloss change of CC1 does not exceed preset threshold, or periodicPHR-timer doesn't time out, PHR will not be triggered.

Condition 2: If CC1 and CC2 have UL Grant, and pathloss change of CC1 exceeds preset threshold, or periodicPHR-timer times out; pathloss change of CC2 does not exceed preset threshold, or periodicPHR-timer doesn't time out, PHR will be triggered with PH information of CC1 carried in PHR MAC CE. Then prohibitPHR-Timer and periodicPHR-Timer on CC1 are restarted successively.

Condition 3: If CC1 and CC2 have UL Grant, and pathloss change of CC1 exceeds preset threshold, or periodicPHR-timer times out; pathloss change of CC2 exceeds preset threshold or periodicPHR-timer times out, PHR will be triggered with PH information of CC1 and CC2 carried in PHR MAC CE. Then prohibitPHR-Timer on CC1 and CC2 and periodicPHR-Timer are restarted successively.

Embodiment VII of the present invention provides the PHR processing method in carrier aggregation system, where prohibitPHR-Timer and periodicPHR-Timer are maintained per CC.

Condition 1: If uplink-retransmitted grant is on CC1 and CC2, PHR will not be triggered;

Condition 2: If CC1 has new UL Grant, and CC2 has retransmitted grant, only PH information of CC1 is reported with prohibitPHR-Timer and periodicPHR-Timer of CC1 restarted.

Condition 3: If CC1 and CC2 have new UL Grant, PH information of CC1 and CC2 is reported and prohibitPHR-Timer and periodicPHR-Timer of CC1 and CC2 are restarted.

Figure 5:
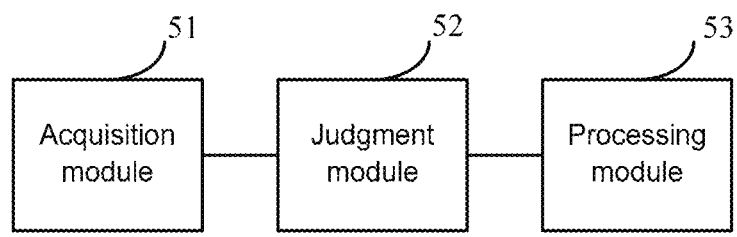
FIG. 5 is a structure diagram of user equipment provided by Embodiment VIII of the present invention.

Based on the same inventive concept with the above method, Embodiment VIII of the present invention provides a user equipment as shown in FIG. 5, including:

Acquisition module 51, which is used for acquiring pathloss change corresponding to uplink carrier in activation state at present;

Judgment module 52, which is used for judging whether PHR is triggered according to said pathloss change acquired by said acquisition module 51;

Processing module 53, which is used for acquiring PH information to be reported and reporting said PH information when judgment result is "Yes".

Said acquisition module 51 is used for acquiring pathloss change corresponding to uplink carrier with UL Grant.

Said acquisition module 51 is used for acquiring pathloss change corresponding to uplink carrier with new UL Grant.

If prohibitPHR-Timer and periodicPHR-Timer are maintained per user equipment;

Said judgment module 52, which is used for judging whether preset trigger condition is met according to said pathloss change when user equipment has new UL Grant on uplink carrier:

Said prohibitPHR-Timer times out, and pathloss change of at least 1 uplink carrier in activation state at the most recent PHR exceeds the preset threshold;

Said periodicPHR-Timer times out;

Configure or reconfigure PHR function;

If one or several of the default trigger conditions are met, PHR will be triggered absolutely; otherwise, PHR will not be triggered.

Said processing module 53, which is used for acquiring PH information of all uplink carriers in activation state, and making such information carried in PHR MAC CE to be reported to network.

Said processing module 53 is also used for starting or restarting periodicPHR-Timer and prohibitPHR-Timer.

prohibitPHR-Timer is maintained per component carrier and periodicPHR-Timer is maintained per user equipment;

Said judgment module 52, which is used for judging whether each uplink carrier in activation state meets preset trigger condition according to pathloss change when said user equipment has new UL Grant on a certain uplink carrier:

ProhibitPHR-Timer on uplink carrier in activation state times out, and pathloss change of said uplink carrier at the most recent PHR exceeds the preset threshold;

PeriodicPHR-Timer of said user equipment times out;

Configure or reconfigure PHR function;

If meeting one or several of the default trigger conditions, PHR will be triggered absolutely; otherwise, PHR will not be triggered.

Said processing module 53, which is used for acquiring PH information of said uplink carrier and make such information carried in PHR MAC CE to be reported to network side when prohibitPHR-Timer on activated uplink carrier meeting preset trigger condition times out and pathloss change of said uplink carrier at the most recent PHR exceeds preset threshold;

When periodicPHR-Timer of said user equipment meeting default trigger conditions times out, and/or, configure or reconfigure PHR functions, acquire PH information of all uplink carriers in activation state and make PH information of all uplink carriers in activation state carried in PHR MAC CE to be reported to network side.

Said processing module 53, which is also used for restarting prohibitPHR-Timer on uplink carrier carrying PH information in PHR MAC CE;

Restart periodicPHR-Timer when PHR MAC CE reporting.

If prohibitPHR-Timer and periodicPHR-Timer are maintained per component carrier;

Said judgment module 52, which is used for judging whether each uplink carrier with UL Grant meets preset trigger condition according to pathloss change when user equipment has new UL Grant on a certain uplink carrier:

ProhibitPHR-Timer of this CC times out, and pathloss change of this CC at the most recent PHR exceeds the preset threshold;

PeriodicPHR-Timer of this CC times out;

Configure or reconfigure PHR function;

If one or several of the default trigger conditions are met, PHR will be triggered absolutely; otherwise, PHR will not be triggered.

Said processing module 53, which is used for acquiring PH information of uplink carrier of triggered PHR and making such information carried in PHR MAC CE to be reported to network side.

Said processing module 53, which is also used for starting or restarting periodicPHR-Timer and prohibitPHR-Timer on uplink carrier of said triggered PHR.

Said processing module 53, which is also used for reporting said PHR MAC CE through this component carrier or other component carriers during PHR MAC CE reporting; indication information of component carrier shall be carried in PHR MAC CE when PHR MAC CE is reported through other component carriers.

Herein, modules of the inventive device can be integrated or deployed separately. Said modules can be either combined into one module or further decomposed into multiple submodules.

Through description of the above embodiments, technical personnel of the field can clearly understand that the present invention is realized depending on software and necessary general hardware platform, and also can be realized through hardware, while the former is better in many cases. Based on this understanding, the technical solution of the present invention or the part making contributions to available technology can be essentially reflected by means of software product. This computer software product is stored in a storage medium, including several instructions to enable a computer unit (such as personal computer, sever, or network equipment, etc.) to implement the methods described in all embodiments of the present invention.

Technical personnel of the field can understand that the drawings only refer to the diagram of a preferred embodiment, and the module or procedure is not indispensable for the implementation of the embodiments of the present invention.

Technical personnel of the field can understand that the module of the unit of an embodiment can be distributed in such unit according to embodiment description, or located in one or more units of another embodiment through corresponding changes. Modules of the embodiments mentioned above can be merged into one module, or further divided into multi-submodules.

The number of the aforementioned embodiments of the present invention is only used for description rather than for representing advantages or disadvantages.

Only several specific embodiments of the present invention are released above. However, the present invention is not only comprised of those. Any change that technical personnel of the field can predict shall be protected by the present invention.

What is claimed is:

1. A power headroom reporting (PHR) processing method in a carrier aggregation system, comprising:
   acquiring, at user equipment, a pathloss change corresponding to an uplink carrier which is in an activation state at present;
   determining, by said user equipment based on said pathloss change, whether a PHR is to be triggered or not;
   acquiring power headroom (PH) information to be reported and reporting said PH information, by said user equipment, if said user equipment determines that said PHR is to be triggered;
   wherein a prohibitPHR-Timer and a periodicPHR-Timer are maintained per user equipment, and said determining, by said user equipment based on said pathloss change, whether a PHR is to be triggered or not comprises:
   determining, by said user equipment based on said pathloss change, whether preset trigger conditions are met, if said user equipment has a new uplink grant (UL Grant) on an uplink carrier, wherein the preset trigger conditions comprise:
      said prohibitPHR-Timer times out, and a pathloss change of at least one uplink carrier in said activation state from the most recent PHR exceeds a preset threshold;
      said periodicPHR-Timer times out; and
      a PHR function is configured or reconfigured; and
   triggering said PHR if one or several of the preset trigger conditions are met; otherwise, not triggering said PHR; and
   wherein said acquiring PH information to be reported and reporting said PH information, by said user equipment comprises:
   acquiring, by said user equipment, PH information of all uplink carriers in said activation state and making, by said user equipment, said PH information to be carried in a PHR media access control control element (MAC CE) and reported to a network side.

2. The method as claimed in claim 1, wherein said acquiring, at user equipment, a pathloss change corresponding to an uplink carrier which is in an activation state at present comprises:
   acquiring, by said user equipment, a pathloss change corresponding to an uplink carrier with a UL Grant; and/or, acquiring, by said user equipment, a-pathloss change corresponding to an uplink carrier with anew UL Grant.

3. The method as claimed in claim 1, further comprising: starting or restarting, by said user equipment, said periodicPHR-Timer and said prohibitPHR-Timer.

4. The method as claimed in claim 1, wherein said user equipment reports said PHR MAC CE through said uplink carrier on which said user equipment has said new UL Grant or through other component carriers during reporting through said PHR MAC CE; and if said PHR MAC CE is reported through said other component carriers, said PHR MAC CE carries component carrier indication information.

5. A user equipment comprising a computer processor and a computer-readable storage medium which stores a plurality of computer-executable instructions, wherein the computer-executable instructions, when being executed by the computer processor, cause the computer processor to:
acquire a pathloss change corresponding to an uplink carrier which is in an activation state at present;
determine whether a power headroom reporting (PHR) is to be triggered or not, based on said pathloss change acquired through said acquisition module;
acquire power headroom (PH) information to be reported and report said PH information if said determination module determines that said PHR is to be triggered;
wherein a prohibitPHR-Timer and a periodicPHR-Timer are maintained per user equipment; and
the computer-executable instructions, when being executed by the computer processor, cause the computer processor to determine whether preset trigger conditions are met based on said pathloss change, if said user equipment has a new uplink grant (UL Grant) on an uplink carrier, wherein the preset trigger conditions comprise:
said prohibitPHR-Timer times out, and a pathloss change of at least one uplink carrier in said activation state from the most recent PHR exceeds a preset threshold;
said periodicPHR-Timer times out; and
a PHR function is configured or reconfigured; and
wherein if one or several of the preset trigger conditions are met, said PHR is triggered; otherwise, said PHR is not triggered; and
wherein the computer-executable instructions, when being executed by the computer processor, cause the computer processor to:
acquire PH information of all uplink carriers in said activation state and making said PH information to be carried in a PHR media access control control element (MAC CE) and reported to a network side; and
start or restart said periodicPHR-Timer and said prohibitPHR-Timer.

6. The user equipment as claimed in claim 3, wherein the computer-executable instructions, when being executed by the computer processor, cause the computer processor to acquire a pathloss change corresponding to an uplink carrier with a UL Grant at present; or,
acquire a pathloss change corresponding to an uplink carrier with anew UL Grant at present.

* * * * *